Nov. 1, 1949  A. B. MILLER  2,486,753
HOT BEARING DETECTOR
Filed March 29, 1946
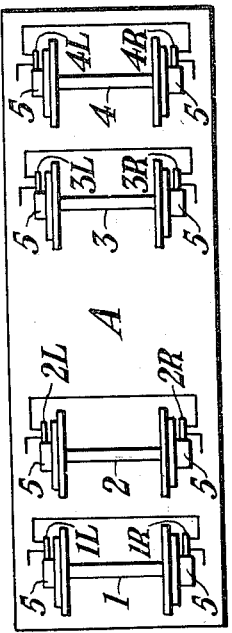
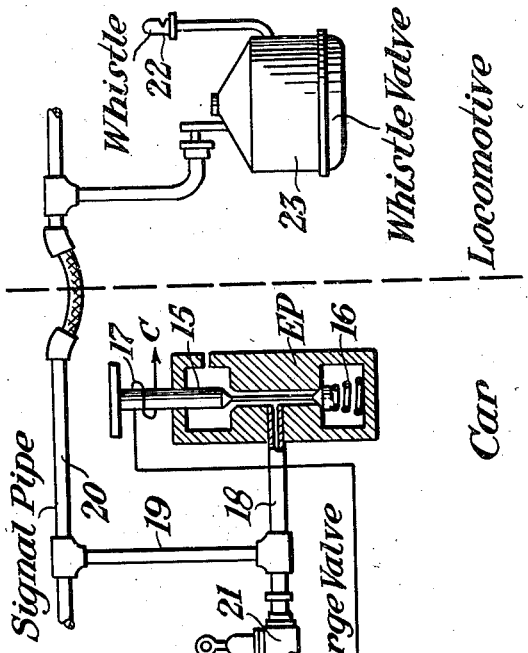
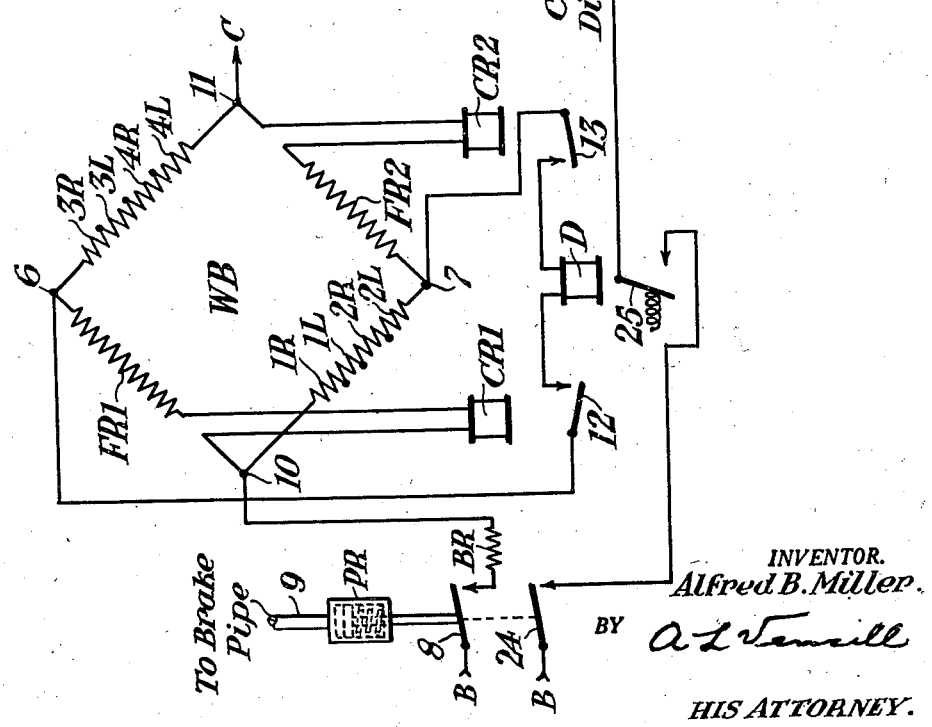
INVENTOR.
Alfred B. Miller.
BY
HIS ATTORNEY.

Patented Nov. 1, 1949

2,486,753

UNITED STATES PATENT OFFICE 2,486,753

HOT BEARING DETECTOR

Alfred B. Miller, Edgewood, Pa., assignor to The Union Switch & Signal Company, Swissvale, Pa., a corporation of Pennsylvania Application March 29, 1946, Serial No. 658,031

9 Claims. (Cl. 177—311)

My invention relates to hot bearing detectors, that is, to devices for detecting and indicating when a bearing has reached an unsafe operating temperature.

One object of my invention is to provide a hot bearing detector which is particularly suitable for, although in no way limited to, use on railway passenger cars for detecting a defective wheel or axle bearing.

Another object of my invention is to provide a simple dependable hot bearing detector of the type described which works on the closed circuit principle, and which provides a means for automatically audibly signaling the engineman through the usual train signal line upon the occurrence of a hot bearing on any car of the train.

According to a preferred form of my invention, the bearing detector comprises a wheatstone bridge the four arms of which are made up of temperature responsive resistance units. The resistance units in two of the opposite arms of the bridge are subjected to ambient temperatures only, and have check relays connected in series therewith to provide a constant check that these arms are intact. If only one bearing is to be checked the resistance unit in one of the two remaining arms of the bridge is subjected to the temperature of this bearing, whereas if it is desired to use the detector to detect more than one bearing a resistance unit for each bearing to be detected is subjected to the temperature of such bearing, and these resistance units are preferably divided equally between the said two remaining bridge arms so that these arms will have the same resistances when all of the bearings are at the same temperature. A source of unidirectional current is connected across two of the opposite corners of the bridge, and a detector relay is connected across the other two corners of the bridge over front contacts of the said check relays. The parts are so proportioned that the resistances of the resistance units which are subjected to the bearing temperatures will be lower than those which are subjected to ambient temperature so long as all resistance units are all at the same temperature, but that, as the temperature of any bearing approaches the danger point the resistance of the associated resistance will increase to a value which causes the bridge to become substantially balanced. The detector relay will of course be picked up or released according as the bridge is unbalanced or balanced, and may be used to control any desired signal to indicate the occurrence of the hot bearing.

Other objects and characteristic features of my invention will become apparent as the description proceeds.

In the accompanying drawing, Fig. 1 is a diagrammatic view of a railway car A having applied thereto certain of the elements of a bearing detector constructed in accordance with my invention. Figure 2 is a diagrammatic view illustrating one form of bearing detector employing the elements shown in Fig. 1 and embodying my invention.

Similar reference characters refer to similar parts in both views.

For convenience in illustrating my invention, and because my invention is particularly applicable for use in railway passenger cars I have shown it in the drawings in the form it would assume when employed on a passenger car of the well-known two truck four axle type, but it should be distinctly understood at the outset that my invention is not limited to this particular form or this particular application.

Referring first to Fig. 1, the reference character A designates a railway car the axles 1, 2, 3 and 4 of which are supported at their ends in journal boxes 5 of any of the usual and well-known types. Associated with each journal box in a manner to be constantly subjected to the temperature of the axle bearing used therein is a temperature sensitive resistance unit designated by the same reference character as the reference character for the associated axle with a distinguishing subscript L or R according as the resistance unit is disposed at the left-hand or right-hand end of the car axle, as viewed from the left in Fig. 1. For example, in bearings employing the usual journal brasses each resistance unit may be mounted in a hole drilled in the outer end of the journal brass of the associated bearing. Each resistance unit preferably comprises a coil of ballast type wire having a high temperature coefficient of resistivity, which coefficient is practically constant under a wide temperature range so that the resistance of the unit will change a relatively large amount in response to the change in temperature which normally takes place in a bearing when the bearing starts to become defective.

Referring now to Fig. 2, the reference character WB designates a wheatstone bridge one of the arms of which comprises the resistance units IR, IL, 2R and 2L connected in series, and the opposite arm of which comprises the resistance units 3R, 3L, 4R and 4L connected in series. The remaining two arms of the bridge comprise resistors FR1 and FR2 connected in series with check relays CR1 and CR2, respectively. It is immaterial how the resistance units 1R, 1L, 2R, 2L, 3R, 3L, 4R and 4L associated with the car A are grouped in the first mentioned arms of the bridge, but for convenience I have shown the resistances associated with the two axles on one truck disposed in one arm and the resistances associated with the two axles on the other truck disposed in the other arm since this grouping of the resistance units tends to simplify the circuit wiring on the car. The fixed resistors FR1 and FR2 may be constructed of the same type wire as the other resistance units but are arranged to be subjected to ambient temperature only.

The check relays CR1 and CR2 may be of any suitable type so constructed that they will normally be energized when the bridge is energized so long as the associated arm of the bridge is intact regardless of whether the bridge is balanced or unbalanced, but will become deenergized immediately in the event that the associated arm of the bridge becomes open circuited for any reason.

The resistances of the various resistance units and resistors are so chosen, and the parts are so proportioned that when the temperatures of all of the resistors and resistance units are substantially the same the total resistances of the two arms containing the resistance units subjected to the bearing temperatures will be equal but will be lower than those of the two arms containing the fixed resistors FR1 and FR2, but that, as the temperature of any bearing rises to a point approaching the danger point the resistance of the associated resistor will increase sufficiently to substantially balance the bridge.

A suitable source of unidirectional energizing current is connected across the two opposite corners 10 and 11 of the bridge, and a detector relay D is connected across the remaining two opposite corners 6 and 7 of the bridge over front contacts 12 and 13 of the checking relays CR1 and CR2. The nature of the current source is not important and only the terminals B and C have therefore been shown in the drawing. Included in the energizing circuit for the bridge is a ballast resistor BR the function of which is to compensate for variations in the voltage of the current supply during operation of the apparatus, as will appear more fully hereinafter.

Also included in the energizing circuit for the bridge is the contact 8 of a pneumatic relay PR. This relay is connected through the medium of a pipe 9 to the brake pipe on the car A in such manner that it will close its contact 8 when and only when the brake pipe is supplied with fluid pressure. It will be seen, therefore, that the pneumatic relay PR functions to connect the bridge with the current supply when and only when the car is coupled in the train.

The detector relay D may be of any desired type, but as here illustrated it is a biased polar relay, one well-known form of which is disclosed and claimed in Letters Patent of the United States No. 2,283,270, granted to Robert M. Laurenson on December 4, 1941, for Electrical relays.

The apparatus also comprises an electropneumatic valve consisting of an armature 15 biased to an upper position by means of a spring 16 and provided with an energizing winding 17. This valve is connected with the usual car signal pipe 20 in multiple with the usual discharge valve 21 by means of pipes 18 and 19 in such manner that when the valve is deenergized it will vent the signal pipe to atmosphere to thereby produce a reduction in pressure in the signal pipe. As is well known, the signal pipe extends throughout the length of the train and is connected on the locomotive with a whistle 22 through the medium of a whistle valve 23. The whistle valve may have any desired construction, one well-known form of which is described in detail in Letters Patent of the United States No. 2,028,605, granted to Ellis E. Hewitt on January 21, 1936, for a Signal valve device. It will be understood that whenever a reduction of the pressure in the signal pipe 20 of a certain duration occurs due either to operation of the car discharge valve 21 or to deenergization of the electropneumatic valve EP, the whistle valve 23 will operate to cause fluid under pressure to be supplied from the signal pipe, as well as from a charged chamber in the reservoir in the whistle valve, to the whistle 22 to thereby blow the whistle.

The winding 17 of the electropneumatic valve EP is supplied with energy from the terminals B and C of the source over an energizing circuit which includes a contact 24 of the pneumatic relay PR which becomes closed whenever this relay is connected to the brake pipe, and a contact 25 of the relay D which becomes closed when the bridge is unbalanced.

The operation of the apparatus as a whole is as follows: When the car is uncoupled from a train the brake pipe 9 is vented to atmosphere, and under these conditions the relay PR opens its contacts 8 and 24. The opening of the contact 8 removes all energy from the bridge, and the check relays CR1 and CR2 and the detector relay D are therefore all deenergized. The opening of the contact 24 of the pneumatic relay PR interrupts the circuit for the electropneumatic valve EP, so that this valve is also deenergized.

When the car is coupled into a train, air pressure is of course connected to the brake pipe, and the pneumatic relay PR therefore closes its contacts 8 and 24, and thus causes energy to be supplied to the bridge circuit WB. Due to the previously pointed out proportioning of the parts if the temperatures of the bearings of the car A are then at ambient temperature or are all at the same temperature, as will usually be the case, the resistances of the two arms of the bridge including the associated resistance units 1R, 1L, 2R, 2L, 3R, 3L, 4R and 4L will be equal but will be less than the resistances of the remaining two arms of the bridge, and under these conditions the bridge will be unbalanced so that the check relays CR1 and CR2 and the detector relay D will all become energized. When the detector relay D becomes energized, the resultant closing of its contact 25 will complete the energizing circuit for the electropneumatic valve EP, and this valve will therefore become energized and will prevent the venting of fluid from the signal pipe 20 through this valve. The parts will then remain in the position just described without further change so long as the resistances of the resistance units associated with the car bearings do not increase more than the increase which normally takes place in normal operation of the car. If, however, the temperature of any bearing increases abnormally, the resultant rise in resistance of the associated resistor will cause the bridge to become more nearly balanced; and if the temperature continues to increase to the point where danger to the bearing is likely to result, the bridge will become sufficiently balanced to cause the relay D to open its contact 25. When this happens the electropneumatic valve EP will become deenergized, and will vent the signal pipe to atmosphere which, in turn, will cause the whistle 22 to blow and thus warn the train crew that a bearing is overheated. An increase in resistance of the resistance units which are responsive to the bearing temperatures above the value which causes the bridge to become balanced will merely throw the bridge off balance in such a direction as to cause current to flow through the relay D in the opposite direction from that necessary to pick up this relay since this relay is of the biased polar type, and this increase of current will only tend to hold the relay in its released position.

From the above it will be apparent that by properly proportioning the various resistors that make up the bridge WB the relay D can be made to release upon the occurrences of any predetermined change in temperature of the bearings. Normally these resistors will be so proportioned that at the nominal operating temperature of the bearings above ambient temperature the bridge will be off balance an amount which is just sufficient to maintain the current flowing through relay D slightly above the release current of the relay. Consequently as soon as a temperature change in excess of the normal temperature variation occurs relay D will release and produce a signal.

With the bridge constructed as shown each of the arms which contains the resistances which are subjected to the bearing temperatures includes four separate resistances. If greater sensitivity is desired the number of resistances in these arms may be decreased and the resistances which are removed from the arms may be included in a similar bridge the detector relay of which may be employed to control the electropneumatic valve EP in such manner that the releasing of the detector relay of any one of the bridges will act to deenergize the electropneumatic valve EP and thus cause the whistle to blow. As the number of resistance units which are subjected to bearing temperatures and which are included in any one arm of the bridge decreases the operating margins will increase in proportion, the maximum operating margin being obtained when only one resistance unit which is responsive to bearing temperature is included in the bridge and the remaining resistance units are all fixed resistors.

Since the operation of the devices as disclosed depends upon the ratio of the resistances of the arms containing the fixed resistances to the resistances of the other arms and since all of the resistance units may be mounted where they are subjected to ambient temperature changes, the device is selfcompensating between winter and summer operation. This is very desirable for the reason that at 40° below zero ambient temperature the unsafe temperature of a bearing is likely to be considerably lower than when the ambient temperature is 100° above zero.

It should be particularly pointed out that the detector embodying my invention operates on the normally energized principle; that is to say, the failure of any of the parts to function as intended will produce a warning signal rather than prevent one. If desired, the fixed resistors FR1 and FR2 may be eliminated by winding the coils of the check relays with an equivalent amount of resistance wire.

Although I have herein shown and described only one form of bearing detector embodying my invention, it is understood that various changes and modifications may be made therein within the scope of the appended claims without departing from the spirit and scope of my invention.

Having thus described my invention, what I claim is:

1. A bearing detector comprising a first temperature responsive resistance unit subjected to the temperature of the bearing to be detected, a Wheatstone bridge one of the arms of which includes said resistance unit and the remaining arms of which include other temperature responsive resistance units subject to ambient temperature only, two check relays in series with the ambient temperature responsive resistance unit in two of the opposite arms of said bridge, a source of unidirectional current connected across two of the opposite corners of said bridge, and a detector relay of the biased polar type connected across the remaining two opposite corners of said bridge over contacts of said check relays.

2. A bearing detector comprising a first temperature responsive resistance unit subjected to the temperature of the bearing to be detected, a Wheatstone bridge one of the arms of which includes said resistance unit and the remaining arms of which include other temperature responsive resistance units subject to ambient temperature only, two check relays in series with the ambient temperature responsive resistance unit in two of the opposite arms of said bridge, a source of unidirectional current connected across two of the opposite corners of said bridge, and a detector relay of the biased polar type connected across the remaining two opposite corners of said bridge over contacts of said check relays, the parts being so proportioned that said bridge will normally be unbalanced but will become substantially balanced due to the increase in resistance of said unit upon the occurrence of a hot bearing.

3. A bearing detector comprising a Wheatstone bridge two of the opposite arms of which include temperature responsive resistance units subjected only to ambient temperature and the remaining arms of which include temperature responsive resistance units subjected to the temperature of different bearings to be detected and effective upon the heating of a bearing to substantially balance said bridge, two check relays one connected in series with each of said temperature responsive resistance units which are subjected to ambient temperature only, means for impressing a unidirectional voltage on two of the opposite corners of said bridge, and a detector relay of the biased polar type connected across the remaining two corners of said bridge over front contacts of said check relays, said check relays being proportioned to be energized except upon the failure of the associated arm of the bridge and said detector relay being adjusted to be energized except when said bridge becomes substantially balanced.

4. A bearing detector comprising a first temperature responsive resistance unit subjected to the temperature of the bearing to be detected, a Wheatstone bridge one of the arms of which includes said resistance unit and the remaining arms of which include other temperature responsive resistance units subject to ambient temperature only, two check relays in series with the temperature responsive resistance units in two opposite arms of said bridge, a source of unidirectional current connected across two of the opposite corners of said bridge, a detector relay of the biased polar type connected across the remaining two opposite corners of said bridge over contacts of said check relays, and signaling means controlled by said detector relay.

5. A bearing detector comprising a Wheatstone bridge two of the opposite arms of which include temperature responsive resistance units subjected only to ambient temperature and the remaining arms of which include temperature responsive resistance units subjected to the temperature of different bearings to be detected and effective upon the heating of a bearing to substantially balance said bridge, two check relays one connected in series with each of said temperature responsive resistance units which are subjected to ambient temperature only, means for impressing a unidirectional voltage on two of the opposite corners of said bridge, a detector relay of the biased polar type connected across the remaining two corners of said bridge over front contacts of said check relays, said check relays being proportioned to be energized except upon the failure of the associated arm of the bridge and said detector relay being adjusted to be energized except when said bridge becomes substantially balanced, and signaling means controlled by said detector relay.

6. In a bearing detector for a device having a plurality of bearings, a temperature responsive resistance unit for each bearing subjected to the temperature of the associated bearing, a Wheatstone bridge two of the arms of which comprise temperature responsive resistance units subjected to ambient temperature only and the remaining two arms of which include the resistance units responsive to bearing temperatures, the parts being so proportioned that said bridge will be unbalanced when all of said resistance units are at substantially the same temperature but will become substantially balanced upon the heating of a resistance unit due to a defective bearing, means for detecting the balanced or unbalanced condition of said bridge, two check relays one connected in series with each of said temperature responsive resistance units which are subjected to ambient temperature only, means for impressing a unidirectional voltage on two of the opposite corners of said bridge, and a detector relay of the biased polar type connected across the remaining two corners of said bridge over front contacts of said check relays, said check relays being proportioned to be energized except upon the failure of the associated arm of the bridge and said detector relay being adjusted to be energized except when said bridge becomes substantially balanced.

7. Apparatus for detecting when the impedance of an electric circuit element is of a predetermined value comprising a Wheatstone bridge one of the arms of which includes said electric circuit element, two check relays included respectively in the two arms of said bridge which are disposed on opposite sides of the arm including said electric circuit element, means for impressing a potential across two of the opposite corners of said bridge, the parts being so proportioned that each check relay will be energized so long as the arm including such relay is intact and that said bridge will normally be unbalanced but will tend to become balanced as said electric circuit element approaches said predetermined value, and means controlled in part by said check relays for detecting the balanced or unbalanced condition of said bridge.

8. Apparatus for detecting when the impedance of an electric circuit element is of a predetermined value comprising a Wheatstone bridge one of the arms of which includes said electric circuit element, two check relays included respectively in the two arms of said bridge which are disposed on opposite sides of the arm including said electric circuit element, means for impressing a potential across two of the opposite corners of said bridge, the parts being so proportioned that each check relay will be energized so long as the arm including such relay is intact and that said bridge will normally be unbalanced but will tend to become balanced as said electric circuit element approaches said predetermined value, a detector relay, and a circuit for said detector relay receiving energy from said bridge and including a front contact of each of said check relays.

9. Apparatus for detecting when the impedance of an electric circuit element is of a predetermined value comprising a Wheatstone bridge one of the arms of which includes said electric circuit element, two check relays included respectively in the two arms of said bridge which are disposed on opposite sides of the arm including said electric circuit element, means for impressing a unidirectional potential across two of the opposite corners of said bridge, the parts being so proportioned that each check relay will be energized so long as the arm including such relay is intact and that said bridge will normally be unbalanced but will tend to become balanced as said electric circuit element approaches said predetermined value, and a detector relay of the biased polar type connected across the remaining two corners of said bridge over front contacts of said check relays and adjusted to be energized or deenergized according as said bridge is unbalanced or substantially balanced.

ALFRED B. MILLER.

REFERENCES CITED

The following references are of record in the file of this patent:

UNITED STATES PATENTS

| Number | Name | Date |
|---|---|---|
| 2,420,968 | Newell | May 20, 1947 |

FOREIGN PATENTS

| Number | Country | Date |
|---|---|---|
| 539,543 | Great Britain | Sept. 16, 1941 |